United States Patent [19]
Carr, Jr.

[11] 3,944,336
[45] Mar. 16, 1976

[54] UNI-DIRECTIONAL VIEWING SYSTEM
[75] Inventor: W. John Carr, Jr., Hayward, Wis.
[73] Assignee: Electron Optics Corporation, Hayward, Wis.
[22] Filed: July 12, 1974
[21] Appl. No.: 487,582

[52] U.S. Cl. ............... 350/174; 350/291; 350/301
[51] Int. Cl.² .................... G02B 27/14; G02B 5/08
[58] Field of Search ........... 350/291, 301, 174, 147, 350/52; 353/20; 351/1; 272/8.5; 352/4

[56] References Cited
UNITED STATES PATENTS

| | | | |
|---|---|---|---|
| 1,636,834 | 7/1927 | Peters et al. | 350/174 |
| 2,286,570 | 6/1942 | Pollack | 350/147 |
| 2,663,218 | 12/1953 | Ranseen | 350/291 |
| 2,711,667 | 6/1955 | Simjian | 350/174 |
| 2,796,801 | 6/1957 | Simjian | 350/174 |
| 2,926,559 | 3/1960 | Oppenheimer | 350/291 |

Primary Examiner—Alfred E. Smith
Assistant Examiner—Jon W. Henry
Attorney, Agent, or Firm—Morse, Altman, Oates & Bello

[57] ABSTRACT

A uni-directional viewing system with an obliquely disposed mirror defining a beam splitter for partial reflection and partial transmission of a light beam that is generated by a source and having an absorber disposed at one side of the mirror for absorbing the beam that is transmitted through the mirror. The reflected beam is directed towards a viewing port, which is disposed at the other side of the mirror. An eye port, which is disposed on the absorber side of the mirror, is provided for observing a subject at the viewing port. The observed subject views only the image of the source and the observer views the observed subject.

11 Claims, 4 Drawing Figures

UNI-DIRECTIONAL VIEWING SYSTEM

BACKGROUND OF THE INVENTION

1. Field of Invention

The present invention relates to optical systems and, more particularly, is directed towards uni-directional viewing systems.

2. Description of the Prior Art

In a wide variety of security and crime prevention applications, it is desirable to provide for the observation of persons in such a manner that the individual being observed cannot detect the presence of the observer. Primarily, such applications are: (1) provisions for observation in business establishments and other institutions for the detection and prevention of thefts, holdups, burglaries, and other crimes, and (2) provisions for the observation of residential doorway areas for the indentification of persons wishing to gain entrance and for the prevention of crime. Other applications include guard houses, prisons, armored cars, and equipment for human and animal behavioral experiments.

In business establishments and other institutions, a number of techniques and devices are used for the observation and prevention of thefts and other crimes by shoplifters, customers, employees, delivery personnel, and others. Among the important methods utilized to reduce crime are (1) employment of uniformed and plainclothesmen, (2) use of both visible and unobtrusive oneway viewing devices such as transparent mirrors and closed-circuit television systems, (3) use of small detachable and electronically detectable devices attached to unsold merchandise, and (4) building and urban design.

A widely employed viewing device for the detection of crime in business establishments and other institutions involves the use of semi-reflective, semi-transparent plate glass sheets also known as transparent mirrors, beam splitter mirrors, two-way mirrors, or one-way mirrors. Such devices partially transmit and partially reflect light. If the area on one side of the glass is in an illuminated environment and the area on the other side of the glass is in a substantially darker environment, the area on the light side is visable through the glass and the area on the dark side is not visable through the glass, the illuminated side being operative as a mirror. Thus, an important disadvantage of such a device is that it requires the observer's area to be kept much darker than the area to be observed. This generally requires the use of a large amount of space for darkened rooms and makes casual observation by a person engaged primarily in other tasks not practical.

In the residential security field, small observation scopes, or peepholes, are mounted in apartment or house doors to provide for the identification of those wishing to gain entrance. The major disadvantages of such devices include: (1) a limited viewing angle, (2) optical distortion of the scene to be viewed if a wide angle lens is used to increase the viewing angle, (3) the ability of the individual being viewed to detect that he is being observed and (4) a limited viewing surface so that the person being observed usually must make his presence known in some other way and casual observation for the prevention of crime in hallways and doorway areas is made impracticable.

Each of these one-way viewing devices, with the exception of small observation scopes, provides the advantage that the person being viewed is unaware that he is under surveillance at any given time. Thus, the occasional use or even the mere presence of such devices may be sufficient to prevent crimes. At times, dummy television cameras are utilized with this purpose in mind.

In some applications, such as retail stores handling expensive merchandise, it is important to provide for unobtrusive viewing in the sense that the individuals do not know that they are under surveillance. In such cases, transparent mirrors have been disguised as conventional mirrors, decorative fixtures, or other objects. Sometimes, scanning television cameras are mounted within such decorative fixtures.

Closed circuit television systems for both institutional and residential use provide unobtrusive and casual observation with a large viewing area. Furthermore, systems employing large numbers of cameras and monitor screens covering different viewing angles and areas can be constructed. However, such systems are relatively expensive and unduly complex. Optical resolution is imperfect and provision for color viewing and depth perception is costly. Generally, cameras are too large to be mounted within doors or other small spaces.

SUMMARY OF THE INVENTION

It is an object of the present invention to provide a unidirectional viewing system, particularly adapted to be installed in walls and doors, which does not suffer from the heretofore mentioned disadvantages. The present invention is characterized by a viewing system with an obliquely disposed plane mirror defining a beam splitter for partial reflection and partial transmission of energy in a light beam and having an absorber for absorbing the transmitted light beam. A light source for generating the light beam is disposed on one side of the mirror and the absorber is disposed on the other side of the mirror. The reflected beam is directed towards a viewing window, which is disposed on the source side of the mirror. An eye piece, which is disposed on the absorber side of the mirror, is provided for observing a subject at the viewing window. The observed subject views only the image of the source and the observer views the observed subject.

It is a further object of the present invention to provide a uni-directional viewing system in which the observed subject views only a diffused beam and the observer views the observed subject.

Other and further objects of the present invention will in part be obvious and will in part appear hereinafter.

The invention accordingly comprises the device possessing the construction, combination of elements, and arrangements of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings, wherein.

DESCRIPTION OF THE PREFERRED EMBODIMENTS

Figure 1:
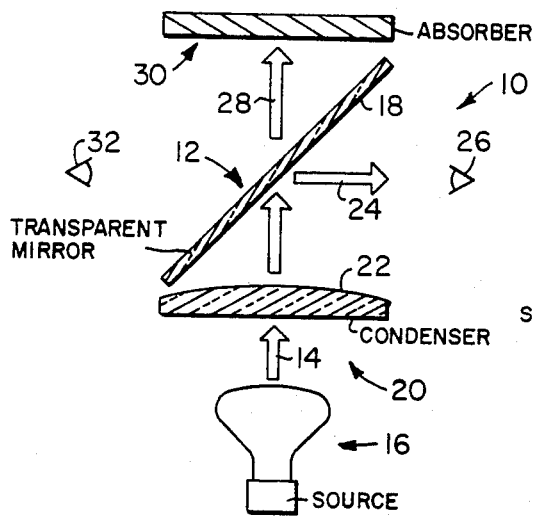
FIG. 1 is a schematic diagram illustrating certain principles of a uni-directional viewing system embodying the present invention.

Referring now to the drawings, particularly FIG. 1, there is shown a uni-directional viewing system 10 embodying the present invention. Viewing system 10 comprises an obliquely disposed semi-reflective, semi-transparent member 12, for example a plane mirror, which defines a beam splitter or transparent mirror for partial reflection and partial transmission of energy in a light beam 14 that is generated by a source 16. Light beam 14 is directed towards a condenser 20 which is interposed between mirror 12 and source 16. Condenser 20 is disposed in a plane that is substantially perpendicular to the axis of light beam 14. Mirror 12 is disposed in a plane that is oblique to the plane of condenser 20 and generally extends upwardly at an angle in the range of 30° to 50°, preferably 45°. The field of light at an upper face 22 of condenser 20 is directed towards a lower face 18 of mirror 12, wherein it is partially reflected and partially transmitted. The partially reflected light, shown at 24, is directed towards an observed subject at 26. The partially transmitted light, shown at 28, is directed towards an absorber 30, wherein it is absorbed. That is, the field of light is reflected towards the observed subject at 26 and is transmitted towards absorber 30. An observer at 32 views the observed subject at 26 through mirror 12 and the observed subjects views only the field of light. Absorber 30 is operative to absorb the transmitted light so that substantially no light is reflected by mirror 12 towards the observer as he views the observed subject.

Figure 2:
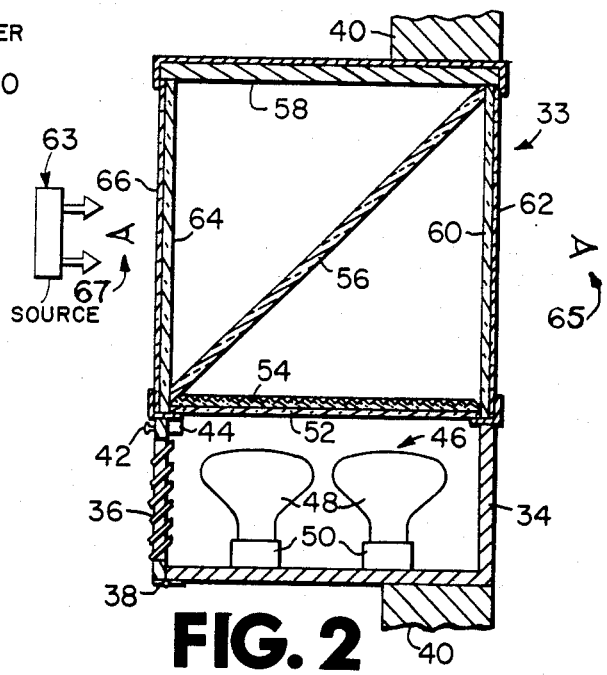
FIG. 2 is a sectional view of a security viewer embodying the invention.

Referring now to FIG. 2, there is shown a uni-directional viewing system 33 that is organized about a housing 34 having an access panel or door 36 hinged at 38. Housing 34 is adapted to be mounted in a wall or door, a wall being shown at 40. In the illustrated embodiment, door 36 is louvered and is provided with a handle 42. A catch 44, which is mounted to housing 34 and door 36, is provided for holding door 35 in a closed position. With door 36 in an opened position, access is gained to a light source 46, for example, a pair of reflector or parabolic light bulbs 48 that are mounted in sockets 50.

The beam generated by light source 46 first passes through a sheet 52 of translucent material which diffuses the light. Sheet 52 is mounted to housing 34 and is disposed in a plane that is substantially perpendicular to the light path. Next, the light passes through a masking filter 54, which is fabricated, for example, by applying randomly distributed shading to sheet 52 by means of decalcomania. In certain applications, masking filter 54 is used to convey intelligence indicia in the form of words, numerals, symbols or graphics to the observed subject by applying the mirror image of the desired indicia to masking filter 54. Light source 46, sheet 52 and masking filter 54 define source means for generating a field of light. In order to obtain maximum camouflage of the observer and his surrounding area, it is preferred that, for critical band masking, the average spatial frequency of the randomly distributed shading lies within two octaves of the average spatial frequency of the scene defined by the observer and his surrounding area when view by the observed subject. In obtaining the camouflage effect, this construction may provide some advantage from lateral inhibitation in vision.

The field of light at the upper face of masking filter 54 is directed towards an obliquely positioned mirror 56. Mirror 56 is mounted to housing 34 and is disposed in a plane that is at an angle of approximately forty-five degrees with respect to the plane of sheet 52. Mirror 56 defines a beam splitter or transparent mirror that partially reflects and partially transmits the field of light. In one embodiment, mirror 56 comprises a sheet of plate glass or acrylic plastic having a thin layer of chromium. In an alternate embodiment, mirror 56 comprises a polyester film having a thin layer of aluminum vacuum deposited thereon. The transmitted field of light is directed towards and is absorbed by a light absorber 58, which includes a stratum of a non-reflective material, for example black felt. The reflected field of light is directed towards a protective transparent sheet 60, for example glass, and a Fresnel lens 62. Protective glass sheet 60, which is mounted in a plane that is substantially perpendicular to the plane of sheet 52 is composed of plate glass or shatterproof glass. Fresnel lens 62 may correspond to a plano-concave lens comprising a thin sheet of polyvinyl chloride having an aspheric optical surface for eliminating spherical aberration.

An eyepiece 64 is mounted to housing 34 at a side opposite transparent sheet 60. Eyepiece 64, for example a glass window, is positioned in optical registration and spaced parallel relationship with transparent sheet 60. In certain applications, a sheet 66 of polarizing material is mounted adjacent eyepiece 64, the polarizing material being employed in conjunction with a source of light in the observers area, shown at 63, that is polarized at right angles to the polarizing material. This construction substantially reduces the amount of light required to be reflected towards the observed subject in order to achieve concealment of the observer and his surrounding area.

In operation, the reflected field of light is directed towards an observed subject at 65 and the transmitted field of light is directed towards light absorber 58. An observer at 67 views the observed subject at 65 through mirror 56 and the observed subject at 65 views only the field of light. Absorber 58 is operative to absorb the transmitted light so that substantially no light is reflected by mirror 56 towards the observer as he views the observed subject.

Figure 3:
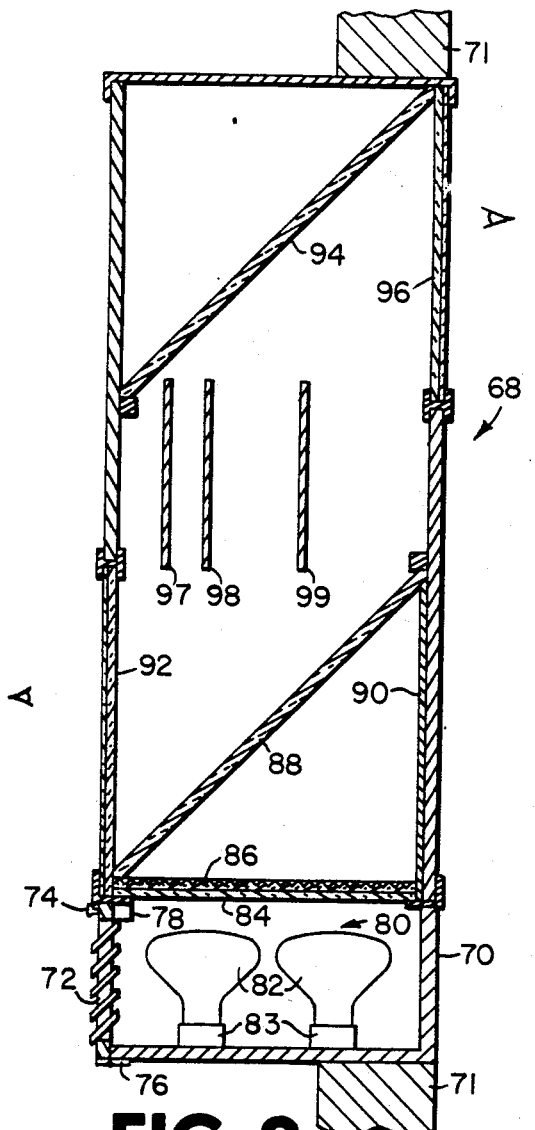
FIG. 3 is a sectional view of an alternate embodiment of the invention.

Referring now to FIG. 3 there is shown an alternate embodiment of the invention in the form of a uni-directional viewing system 68 that is organized about a housing 70, which is adapted to be installed in a wall 71 or a door. Housing 70 is provided with an access panel or louvered door 72 having a handle 74 mounted thereto, door 72 being mounted to housing 70 by means of a hinge 76. A catch 78, which is mounted to door 72 and housing 70, is provided for releasably holding door 72 in a closed position. With door 72 in an opened position, acess is gained to a light source 80, for example a pair of reflector or parabolic light bulbs 82 that are mounted in sockets 83.

The beam generated by light source 80 first passes through and is diffused by a sheet 84 of translucent material. Sheet 84 is mounted to housing 70 above source 80 and is disposed in a plane that is substantially perpendicular to the light path. Next, the light passes through a masking filter 86 that is similar to masking filter 54. Light source 80, translucent sheet 84 and masking filter 86 define source means for generating a field of light. The field of light passing through masking filter 86 is directed towards obliquely disposed mirror 88 that is mounted to housing 70. Mirror 88 is disposed in a plane that is at an angle of approximately 45° with respect to the plane of sheet 84 and defines a beam splitter or transparent mirror that partially reflects and partially transmits the field of light. Mirror 88 is similar to mirror 56. The reflected field of light is directed towards and absorbed by a light absorber 90 comprising a stratum of non-reflective material such as black felt. Light absorber 90 is mounted to housing 70 in perpendicular relaltionship with sheet 84 and in registration with an eyepiece 92. In the illustrated embodiment, mirror 88 extends upwardly from a lower edge of eyepiece 92 to the upper edge of light absorber 90. The transmitted light is directed towards a mirror 94 that is mounted to housing 70 in spaced parallel relationship with mirror 88. Mirror 94 reflects the transmitted field of light towards a window 96 that is mounted to housing 70, window 96 being coplanar with light absorber 90. In order to prevent the observed subject from viewing the observer through window 96 and eyepiece 92, either directly or by means of reflection from mirror 94, baffles 97, 98 and 99 are mounted to housing 70. Each baffle is coextensive with that portion of housing 70 that extends from the upper edge of eyepiece 92 to the lower edge of window 96 and lies in a plane that is in spaced parallel relationship with the plane of eyepiece 92. In the embodiment of FIG. 3, the observer looks through eyepiece 92 and views the observed subject via mirrors 88, 94 and window 96. The observed subject looks through window 96 and views only the field of light via mirror 94 and 88.

Figure 4:
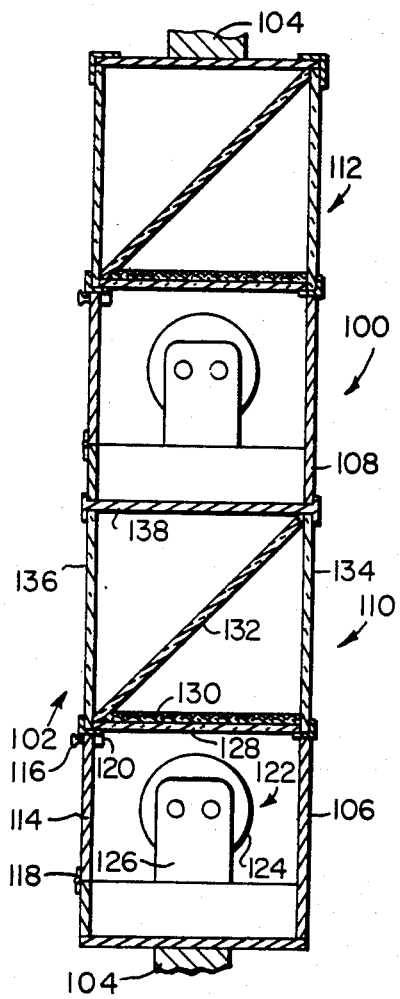
FIG. 4 is a sectional view of a further alternate embodiment of the invention.

Referring now to FIG. 4, there is shown a further alternate embodiment of the invention in the form of a multiple compartment, uni-directional viewing system 100 that is organized about housing 102, which is adapted to be installed in a door 104 or a wall. Housing 102 is provided with a pair of interconnected frames 106 and 108, which divide housing 102 into a pair of compartments 110 and 112. Frame 106 is provided with an access panel or door 114 having a handle 116 mounted thereto, door 114 being mounted to frame 106 by means of a hinge 118. A catch 120, which is mounted to frame 106 and door 114, is provided for releasably holding door 114 in a closed position. Access to a light source 122, for example a fluorescent lamp 124 that is mounted to a socket 126, is gained by opening door 114.

The light generated by light source 122 first passes through a sheet 128 of translucent material and then through a masking filter 130. Translucent sheet 128 is mounted above source 122 and is in perpendicular relationship with the longitudinal axis of housing 102. Translucent sheet 128 and masking filter 130 are similar to translucent sheet 52 and masking filter 54, respectively. The field of light at the upper surface of masking filter 130 is directed towards an obliquely disposed mirror 132 that is mounted to frame 106. Mirror 132 is disposed in a plane that is at an angle of approximately 45° with respect to the plane of translucent sheet 128 and defines a beam splitter or transparent mirror that partially reflects and partially transmits the field of light. Mirror 132 is similar to mirror 56. The reflected field of light is directed towards a window 134, for example a transparent sheet such as a sheet of plate glass or a sheet of shatterproof glass, which is mounted to one side of frame 106 in spaced parallel relationship with the longitudinal axis of housing 102. As viewed in FIG. 4, mirror 132 extends from the left hand edge of translucent sheet 128 upwardly to the upper margin of window 134. An eyepiece 136 is positioned in optical registration and spaced parallel relationship with window 134, mirror 132 being interposed therebetween. The transmitted field of light is directed towards a light absorber 138, for example a non-reflector such as a stratum of black felt, and is absorbed.

Components similar to those mounted within frame 106 are mounted within frame 108. An observer at the eyepiece side of housing 102 views an observed subject at the window side of housing 102 through the transparent mirrors and the observed subject views only the field of light reflected by the transparent mirrors. The light absorber absorbs the transmitted light so that substantially no light is reflected by the transparent mirrors towards the observer as he views the observed subject. It is to be understood that, in alternate embodiments, uni-directional viewing system 100 comprises more than two compartments, for example, three, four or six compartments.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. An optical system for viewing a subject by a viewer, the viewer being optically concealed from the subject, said system comprising:
   a. an eye port through which the viewer looks;
   b. a viewing port for observing the subject;
   c. source means for generating light, said source means including masking means having randomly distributed shading;
   d. light absorbing means;
   e. means for partially reflecting and partially transmitting said light generated by said source means, said partially reflecting and partially transmitting means interposed between said source means and said light absorbing means;
   f. said partially reflecting and partially transmitting means disposed in a plane that is oblique with respect to a path along which said light is directed from said source means, said plane of said partially reflecting and partially transmitting means being such that light is directed towards said viewing port, the viewer looking into said eye port views the subject, the subject looking into said viewing port observes said light, said light absorbing means operative to prevent said light from being reflected towards the viewer, said masking means operative to camouflage the viewer and his surrounding area.

2. The optical system as claimed in claim 1 wherein said source means includes:
   a. a light source for generating a beam of light, said beam of light directed towards said partially reflecting and partially transmitting means;
   condenser means interposed between said light source and said partially reflecting and partially transmitting means, said condenser means operative to direct a field of light towards said partially reflecting and partially transmitting means.

3. The optical system as claimed in claim 1 wherein said source means includes:

a. a light source for generating a beam of light, said beam of light directed towards said partially reflecting and partially transmitting means;

b. a translucent sheet interposed between said light source and said partially reflecting and partially transmitting means, said translucent sheet operative to diffuse said beam of light directed towards said partially reflecting and partially transmitting means.

4. The optical system as claimed in claim 1 wherein said partially reflecting and partially transmitting means is mirror means defining a beam splitter.

5. The optical system as claimed in claim 1 wherein said light absorbing means non-reflector is a stratum of black felt.

6. The optical system as claimed in claim 1 including:
a. a stratum of polarized material mounted adjacent said observing port; and
b. a polarized light source in an area in which the viewer is located, said polarized light source generating light that is polarized at right angles with respect to the polarization of said stratum of polarized material.

7. An optical system for viewing a subject by a viewer, the viewer being optically concealed from the subject, said system comprising:
a. source means for generating light;
b. light absorbing means; and
means for partially reflecting and partially transmitting said light generated by said source means, said partially reflecting and partially transmitting means interposed between said source means and said light absorbing means, said partially reflecting and partially transmitting means being transparent mirror means;
d. said source means including a light source for generating a beam of light, said beam of light directed towards said partially reflecting and partially transmitting means, a translucent sheet interposed between said light source and said partially reflecting and partially transmitting means, said translucent sheet operative to diffuse said beam of light directed towards said partially reflecting and partially transmitting means, and masking means interposed between said translucent sheet and said partially reflecting and partially transmitting means, said masking means having randomly distributed shading;
e. said transmitted light directed towards said light absorbing means, said reflected light directed towards the subject, the viewer observing the subject through said partially reflecting and partially transmittng means, the subject viewing only said light reflected by said partially reflecting and partially transmitting means, said light absorbing means operative to prevent said transmitted light from being reflected towards the viewer.

8. An optical system for viewing a subject by a viewer, the viewer being optically concealed from the subject, said system comprising:
a. a housing;
b. source means mounted to said housing at one end thereof, said light source generating a beam of light that is directed along a path towards an opposite end of said housing;
c. a viewing port for the subject mounted to said housing proximate said opposite end thereof;
d. an observing port for the viewer mounted to said housing proximate said one end thereof, said observing port and said viewing port disposed in planes that are in space parallel relationship wtih a longitudinal axis of said housing; and observing port and said viewing port mounted on opposite sides of said housing;
e. light absorbing means mounted to said housing on said side opposite said observing port at said one end, said light absorbing means disposed in a plane that is in spaced parallel relationship with the plane of said viewing port;
f. means for partially reflecting and partially transmitting said light generated by said source, said partially reflecting and partially transmitting means mounted to said housing proximate to said one end and disposed in a plane that is oblique to said light path, said partially reflected light directed towards said light absorbing means, said partially transmitted light directed along said light path; and
g. means for reflecting said partially transmitted light towards said viewing port, said reflecting means mounted to said housing proximate to said opposite end and disposed in a plane that is oblique to said light path;
h. the viewer looking through said observing port views the subject at said viewing port through said partially reflecting and partially transmitting means and said reflecting means, the subject looking through said viewing port observes only said light transmimtted by said partially reflecting and partially transmitting means, said light absorbing means operative to prevent said partially reflected light from being transmitted towards said observing port, said partially reflecting and partially transmitting means being transparent mirror means;
i. said source means including a light source for generating a beam of light, said beam of light directed towards said transparent mirror means, a translucent sheet interposed between said light source and said transparent mirror means, said translucent sheet operative to diffuse said beam of light, a field of light directed towards said transparent mirror means, and masking means interposed between said translucent sheet and said transparent mirror means, said masking means having randomly distributed shading.

9. An optical system for viewing a subject by a viewer, the viewer being optically concealed from the subject, said system comprising:
a. an eye port through which the viewer looks;
b. a viewing port for observing the subject;
c. source means for generating light, said source means including masking means through which said light is directed, said masking means having randomly distributed shading, the average spatial frequency of said randomly distributed shading lies within two octaves of the average spatial frequency of a scene defined by the viewer and his surrounding area when viewed through said viewing port;
d. light absorbing means;
e. means for partially reflecting and partially transmitting said light generated by said source means, said partially reflecting and partially transmitting means interposed between said source means and said light absorbing means;
f. said partially reflecting and partially transmitting means disposed in a plane that is oblique with respect to a path along which said light is directed from said source means, said plane of said partially reflecting and partially transmitting means being such that light is directed towards said viewing port, the viewer looking into said eye port views the subject, the subject looking into said viewing port observes said light, said light absorbing means operative to prevent said light from being reflected towards the viewer.

10. An optical system for viewing a subject by a viewer, the viewer optically concealed from the subject, said system comprising;
   a. a housing mountable in a door, said housing including a viewing port for the subject and an observing port for the viewer, said viewing port and said observing ports located at opposite sides of said housing;
   b. source means mounted to said housing at one end thereof, said source means generating light, said source means including masking means having randomly distributed shading;
   c. light absorbing means mounted to said housing at an opposite end thereof; and
   d. means for partially reflecting and partially transmitting said light generated by said source means, said partially reflecting and partially transmitting means mounted to said housing between said source means and said light absorbing means;
   e. said transmitted light directed towards said light absorbing means, said reflected light directed towards said viewing port, the viewer looking through said observing port views the subject at said viewing port through said partially reflecting and partially transmitting means, the subject looking through said viewing port observes only said light reflected by said partially reflecting and partially transmitting means, said light absorbing means operative to prevent said transmitted light from being reflected towards said observing port.

11. The optical system as claimed in claim 10 wherein the average spatial frequency of said randomly distributed shading lies within two octaves of the average spatial frequency of a scene defined by the viewer and his surrounding area when viewed through said observing port.

* * * * *